United States Patent [19]

Fuse et al.

[11] Patent Number: 4,629,286

[45] Date of Patent: Dec. 16, 1986

[54] COATED OPTICAL FIBER CABLE STRUCTURE WHICH PREVENTS LONGITUDINAL CRACKS

[75] Inventors: Kenichi Fuse; Yusei Shirasaka, both of Ichihara, Japan

[73] Assignee: Furukawa Electric Co., Ltd., Tokyo, Japan

[21] Appl. No.: 598,274

[22] PCT Filed: Jul. 5, 1983

[86] PCT No.: PCT/JP83/00213

§ 371 Date: Jun. 5, 1984

§ 102(e) Date: Jun. 5, 1984

[87] PCT Pub. No.: WO84/00216

PCT Pub. Date: Jan. 19, 1984

[30] Foreign Application Priority Data

Jul. 5, 1982 [JP] Japan ............................ 57-101632[U]
Feb. 25, 1983 [JP] Japan ............................ 58-26831[U]

[51] Int. Cl.[4] .................................................... G02B 6/44
[52] U.S. Cl. ............................... 350/96.23; 350/96.10; 350/96.33
[58] Field of Search ............... 350/96.10, 96.15, 96.20, 350/96.23, 96.29, 96.30, 96.33, 96.34

[56] References Cited

U.S. PATENT DOCUMENTS

| | | | |
|---|---|---|---|
| 4,072,400 | 2/1978 | Claypoole et al. | 350/96.33 |
| 4,105,284 | 8/1978 | Olshansky | 350/96.33 |
| 4,113,349 | 9/1978 | Stiles | 350/96.23 |
| 4,114,981 | 9/1978 | Ishida et al. | 350/96.33 |
| 4,334,733 | 6/1982 | Takeshima et al. | 350/96.33 |
| 4,504,112 | 3/1985 | Gould et al. | 350/96.23 |
| 4,522,464 | 6/1985 | Thompson | 350/96.23 |
| 4,523,804 | 6/1985 | Thompson | 350/96.23 |
| 4,552,433 | 11/1985 | Titchmarsh et al. | 350/96.33 |

FOREIGN PATENT DOCUMENTS

| | | | |
|---|---|---|---|
| 2648996 | 5/1977 | Fed. Rep. of Germany | 350/96.23 |
| 55-11233 | 1/1980 | Japan | 350/96.33 |
| 2078996 | 1/1982 | United Kingdom | 350/96.23 |

OTHER PUBLICATIONS

Foord et al., "Principles of Fibre-Optical Cable Design" Pro. of IEE, vol. 123 No. 6, 6/76, pp. 597-602.

*Primary Examiner*—John Lee
*Assistant Examiner*—Brian M. Healy
*Attorney, Agent, or Firm*—George B. Oujevolk

[57] ABSTRACT

There is disclosed a coated optical fiber having a buffer layer around the outer periphery of an optical fiber. A curable resin reinforced coated layer made of reinforced fiber materials is disposed around the outer periphery of the buffer layer and a heatcurable resin is impregnated to the materials and cured. A curable resin layer having no fiber material is interposed between the buffer layer and the reinforced coated layer. The reinforced layer includes therein a multiplicity of elongated fiber materials.

1 Claim, 5 Drawing Figures

COATED OPTICAL FIBER CABLE STRUCTURE WHICH PREVENTS LONGITUDINAL CRACKS

TECHNICAL FIELD

This invention relates to a coated optical fiber in which a reinforcing coated layer formed on the outer periphery of the optical fiber is formed of an FRP and a layer for improving the mechanical and light transmission characteristics (which will be merely termed "transmission characteristics") is interposed between the optical fiber and the FRP coated layer.

BACKGROUND ART

A general coated optical fiber has as a coated layer at the stage of its strands a primary coated layer and a buffer layer, or a buffer layer used also as the primary coated layer, and a reinforcing coated layer on the outer periphery of the buffer layer.

With respect to the reinforcing coated layer, the layer has already formed of an FRP, and when the reinforcing coated layer is made of the FRP, the mechanical characteristics of the coated optical fiber can be largely improved, it is known that an increase in its transmission loss under the using conditions upon variation in the temperature becomes smaller than a general nylon coated optical fiber.

The above-described FRP reinforcing coated layer (which will be termed "an FRP layer") is, as already known, composed of a glass reinforced fiber material disposed along the longitudinal direction of the optical fiber, and thermosetting resin immersed with the material and cured, and the FRP layer is formed in a pipe shape directly above the buffer layer.

However, the FRP layer has only one disadvantage as will be described below.

In other words, when a compression force, twisting, or bending is acted on the FRP layer formed in the pipe shape from the side face, the layer is deformed in a direction that the pipe shape is flattened so that a longitudinal crack may occur along the longitudinal direction of the reinforced fiber material.

This is caused by the buffer layer, which is soft and lack of the above deformation preventing effect, with the result that the longitudinal crack of the FRP layer is produced.

In addition, in case of the coated optical fiber which has the FRP layer, there are still rooms for improving to enhance the transmission characteristics.

A main object of this invention is to prevent the aforementioned longitudinal crack and to also secure high transmission characteristics.

DISCLOSURE OF INVENTION

In this invention, a buffer layer is formed on the outer periphery of an optical fiber, and in a coated optical fiber in which a reinforced resin layer formed of a reinforced fiber material and thermosetting resin immersed with the material and cured is formed on the outer periphery of the buffer layer, a resin layer having no fiber material is advantageously interposed between the buffer layer and the reinforced coated layer.

In the coated optical fiber of this invention, the resin layer supports the reinforced coated layer and suppress the deformation of the reinforced coated layer. Thus, the mechanical characteristics can be improved, and the rate of producing the aforementioned longitudinal crack can be reduced.

As the foregoing description, when the resin layer is further bonded to the reinforced coated layer, the rate of producing the longitudinal crack of the reinforced coated layer can be reduced by the integration of the reinforced coated layer with the resin layer, thereby enhancing the protecting effect of the optical fiber.

Since a microbend of the optical fiber caused by the reinforced coated layer can be prevented by the resin layer, high transmission characteristic of the coated optical fiber can be secured.

BEST MODE OF CARRYING OUT THE INVENTION

A coated optical fiber according to this invention will be described in detail with reference to the accompanying drawings.

Figure 2:
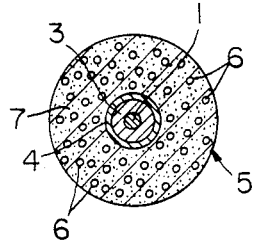
FIGS. 1 and 2 are sectional views showing the representative construction of a coated optical fiber according to the present invention.
Figure 1:
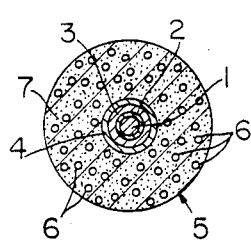

In FIGS. 1 and 2, reference numeral 1 designates an existing quartz optical fiber formed of a core and a clad. In FIG. 1, a primary coated layer 2 and a buffer layer 3 made of silicone resin or the like are formed on the outer periphery of the optical fiber 1. When either one of the both layers 2 and 3 is used also as the other, the other layer may be sometimes omitted.

In FIG. 2, the buffer layer 3 which is used also as the primary coated layer is formed on the outer periphery of the optical fiber 1 as in this example.

Reference numeral 4 denotes a resin layer formed on the outer periphery of the buffer layer 3, and 5 designates a reinforced coated layer formed on the outer periphery of the resin layer 4, and the resin layer 4 is interposed between the buffer layer 3 and the reinforced coated layer 5 in the laminar structure as shown.

The above-described reinforced coated layer 5 is formed of long reinforced fiber materials 6, 6, ... and thermosetting resin 7.

Of them, the materials 6, 6, ... are formed of rovings or yarns of extremely fine fiber, the material of which contains a sole or a composite of glass fiber, carbon fiber, Aramide fiber, molten silica fiber, ceramic fiber of multicomponent (E glass, S glass) or quartz series.

On the other hand, the resin 7 as matrix resin contains suitable ones of various heat-curable resin such as, in addition to unsaturated polyester, epoxy, silicone or vinyl ester, heat-curable polyamide made of bis-maleimide and triazine.

Further the resin layer 4 may be formed of the same or different material as or from the heat-curable resin 7, but mainly contains curable resin such as heat-curable or photo-curable, and/or heat resistant, high Young's modulus thermosetting resin such as polyester resin, polyamide resin (nylon).

The resin layer 4 should, most desirably, exhibit high adhesive to the heat-curable resin layer 7 of the reinforced coated layer 5 and large breaking extension.

The above-described resin concretely contains, thermosetting resin such as nylon, polycarbonate, polymethylmethacrylate (PMMA), polystyrene, or heat-curable and photo-curable (ultraviolet ray-curable) resin such as epoxy acrylic compound, silicone acrylic compound, urethane acrylic compound or copolymer of them.

The resin layer 4 is thinner than the reinforced coated layer 5, and the ratio in thickness of the resin layer 4 to the reinforced coated layer 5 is approx. 1:3 to 1:10.

As a concrete embodiment, in a coated optical fiber in FIG. 1 which has 50 μm/125 μm of core/outer diameter of the optical fiber 1, and approx. 950 μm to 1 mm of outer diameter of the reinforced coated layer 5, the buffer layer 3 which has the thickness of 200 μm or less, and the Young's modulus of 30 kg/mm$^2$ (the Young's modulus exhibits the value at the ambient temperature. The Young's modulus which will be shown, will be similarly exhibited.) or higher, is employed, and the resin layer 4 which has the thickness of 50 μm or lower and the Young's modulus of 70 to 100 kg/mm$^2$, is employed.

Then, the mechanical characteristics of the coated optical fiber of the present invention measured by a crushing test will be described.

In the crushing test of this case, the coated optical fiber of samples having a length of 50 mm were produced, the sample was set by a crushing jig to an Instron tensile strength testing machine, and a side pressure crushing test was conducted at a speed of 0.5 mm/min.

The crushing point was judged by the maximum load point, at which the linearity is maintained in a load curve which varied upon lapse of the time.

In comparison with the embodiments of the present invention, similar tests were conducted for the conventional coated optical fiber.

The results of the conventional example will be previously shown.

(CONVENTIONAL EXAMPLE)

(a) Optical fiber 1
Made of Quartz, GI type, specific refractive index difference Δ=1%, and core/outer diameter=50 μm/125 μm.

(b) Primary coated layer 2
None (c) Buffer layer 3
Made of silicone rubber, Young's modulus=20 kg/mm$^2$, and outer diameter=400 μm.

(d) Optical fiber 1 with buffer layer 3
Transmission loss=2.7 dB/km, (wavelength λ=0.85 μm)

(e) Resin layer 4
None (f) Reinforced resin layer 5
Outer diameter=950 μm, glass content rate=65 vol-%,
Reinforced fiber material 6: Roving formed by gathering several hundreds of E glass fiber having approx. 10 μm of outer diameter.
Heat-curable resin 7: Unsaturated polyester In case of the conventional example made of the above-described structure, the side pressure crushing strength is lowly 1.0 to 1.5 kg/mm, and the transmission loss after forming the reinforced coated layer 5 becomes 4 to 5 dB/km.

(EMBODIMENT 1)

The same as the conventional one in the above paragraphs (a), (b), (c) and (d).

However, the outer diameter in the above paragraph (c) was set to 350 μm.

(e) Resin layer 4
Urethane acrylic compound, Young's modulus=50 kg/mm$^2$. Outer diameter=400 μm.

The same as the conventional one in the above paragraph (f).

(g) Relation to the layers 3 and 4
The buffer layer 3 and the resin layer 4 were isolated via an ultrafine gap, and the resin layer 4 and the reinforced coated layer 5 were bonded to each other.

In case of this embodiment 1, the side pressure crushing strength was ultrafinely increased as compared with the conventional example to 1.3 to 1.6 kg/mm, and the transmission loss after the coated layer 5 is formed was 3.0 dB/km or less, and, thus, considerably suppressed.

(EMBODIMENT 2)

The same as those of the embodiment 1 for the above paragraph (a) to (g). However, the Young's modulus in the above paragraph (e) was set to 75 kg/mm$^2$.

In case of this embodiment 2, the side pressure crushing strength was largely improved as compared with the conventional example to 1.5 to 20 kg/mm, and the transmission loss after the coated layer 5 was formed was 3.0 dB/km or less.

(EMBODIMENT 3)

The same as those of the embodiment 1 for the above paragraphs (a) to (g). However, the Young's modulus in the above paragraph (e) was set to 95 kg/mm$^2$.

In case of this embodiment 3, the side pressure crushing strength exceeded over the embodiment 2 to 2.5 to 2.8 kg/mm, and the light transmission loss after the coated layer 5 is formed was 3 dB/km or less.

(EMBODIMENT 4)

The same as those of the embodiment 1 for the above paragraphs (a) to (g). However, the material in the above paragraph (e) was epoxy acrylic compound having Young's modulus of 120 kg/mm.

In case of this embodiment 4, the transmission loss after the coated layer 5 was formed has secured 3 dB/km or less, but the side pressure crushing strength further exceeded that in the embodiment 3 to 3.0 to 3.3 kg/mm.

(EMBODIMENT 5)

The same as those of the embodiment 1 for the above paragraphs (a), (b), (c), (d) and (f). As to the paragraph (e), nylon 12 having an outer diameter or 400 μm was employed.

In case of this embodiment 5, the side pressure crushing strength has exhibited considerably value to 2.0 to 2.8 kg/mm, but the transmission loss after the coated layer 5 was formed became to 5 to 6 dB/km.

This was considered from the reason that the resin layer 4 was thermally fusion-bonded locally to the inner surface of the coated layer 5, thereby producing ruggedness on the boundary surface between the layers 4 and 5 to cause this to produce a microbend, thereby increasing the transmission loss.

(EMBODIMENT 6)

The same as those of the conventional example for the above paragraphs (a), (b), (c) and (d). However, the material for the above paragraph (c) was silicone resin.
(e) Resin layer 4

Made of unsaturated polyester, Young's modulus = 100 kg/mm, and outer diameter = 450 μm.

For the above paragraph (f), the same as those in which the outer diameter = 1.0 mm was set.

In case of the embodiment 6, the side pressure crushing strength was 1.7 to 2.2 kg/mm, and the light transmission loss was 3 dB/km or less.

Incidentally, in the embodiments 1 to 4, and 6, the reason why the transmission loss after the coated layer 5 was formed can be suppressed to 3 dB/km or less, can be considered as below.

That is, since the reinforced fiber materials 6, 6, 6, . . . has blocked the resin layer 4 to contact directly with the buffer layer 3 in a random state, irregular side pressure exceeding the absorption capacity of the buffer layer 3 is not produced, thereby holding the low loss state of the optical fiber 1.

The Young's modulus of the resin layer 4 may be more than twice that of the buffer layer 3.

The foregoing embodiments have been described in case that an optical fiber was arranged in the coated layer 5. However, according to the present invention, the resin layer 4 may be disposed within the coated layer 5, and a plurality of optical fibers with buffer layers may be disposed inside the layer 5.

Then, preferred embodiment relating to the coated optical fiber of the present invention will be described from the result discussed in view of other points.

A general method of drawing a coated optical fiber has, as described above, the steps of impregnating a reinforced fiber material made of rovings or yarns of extremely fine fiber with liquid heat-curable resin, longitudinally attaching the reinforced fiber material impregnated with the resin along the periphery of the optical fiber strand (which is an optical fiber with a buffer layer), and drawing them through a heating type drawing mold to thereby cure the prescribed resin. The coated optical fiber thus manufactured the optical fiber strand should be covered without eccentricity with the reinforced fiber material impregnated with the resin in the drawing mold. If the degree of eccentricity is large, its transmission loss increases, or the protecting effect of the optical fiber strand against the crushing or bending decreases.

In order to remedy against these problems, the reinforced fiber material should be increased, and the optical fiber strand should be enclosed with many fiber material. Thus, the degree of eccentricity can be reduced, and the transmission characteristic, temperature characteristic and mechanical characteristics seem to be improved. However, as the reinforced fiber material increases, the drawing resistance in the drawing mold actually increases, with the result that a breakage of fiber caused thereby, improper flexibility, irregular impregnation of the resin, and improper external appearance occur.

Figure 3:
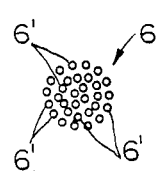
FIG. 3 is an enlarged sectional view of the reinforced fiber material.

To overcome these problems, in the coated optical fiber of the present invention, the volumetric ratio of A to B, i.e., $C = (B/A+B) \times 100$ is set to $45 \leq C \leq 75$, where $d_1$ is the outer diameter of the optical fiber strand (the outer diameter of the buffer layer 3), $d_2$ is the mean diameter of the extremely fine fibers 6', 6', 6', ... in FIG. 3 forming the respective reinforced fiber materials 6, 6, 6, ..., A is the quantity of the heat-curable resin 7, and B is the quantity of the reinforced fiber materials 6, 6, 6, ... Further, the ratio of the outer diameters $d_1$ to $d_2$, i.e., $Dr = (d_2/d_1) \times 100$ is set to $0 < Dr < 6$.

The reasons of setting $45 \leq C \leq 75$, and $0 < Dr < 6$ will now be described below.

Of $C \leq 75$ of $45 \leq C \leq 75$, when the C exceeds by % of volume 75, adverse influence of excessive fiber is presented as described above, with the result that a breakage of fiber at drawing time, improper flexibility, irregular impregnation of the resin, and/or improper external appearance occur.

Accordingly, the upper limit value of the C is 75% by volume.

Then, of $45 \leq C$ of $45 \leq C \leq 75$, when the C decreases by % of volume lower than 45, an eccentricity of the optical fiber strand, an increase in the transmission loss, a decrease in the temperature characteristic and a decrease in the mechanical characteristics, caused by the excessive resin (on the contrary, lack of fiber) occur as described above.

Accordingly, the lower limit value of the C is 45% by volume.

It is not only $45 \leq C \leq 75$ as described above to satisfy the requirement.

For example, when the respective reinforced fiber materials 6, 6, 6, ... impregnated with the resin in roving state are introduced into the drawing mold while enclosing the optical fiber strand, the reinforced fiber materials 6, 6, 6, ... are opened, the extremely fine fibers 6', 6', 6', exist at random in the reinforced coated layer 5, but in case that the diameter of the extremely fine fiber 6' is large when $45 \leq C \leq 75$ is set as described above, the number of the fibers 6' as the component unit of the reinforced fiber material 6 becomes less, and the effect of enclosing the optical fiber strand diminishes.

On the other hand, the thermosetting resin 7 of liquid state (uncured state) impregnated into the respective reinforced fiber materials 6, 6, 6, ... is adhered to the surfaces of the fibers 6', 6', 6', ..., and carried to the fibers 6', 6', 6', ... to be introduced into the drawing mold. Thus, the quantity of carrying the resin of this case is determined depending upon the total surface areas of the fibers 6', 6', 6', ... Even in this case, when the diameter of the fiber 6' is large and the number of the fibers 6' is less, the total surface area becomes small, thereby reducing the resin carrying quantity.

As a result, the setting of $45 \leq C \leq 75$ might become difficult.

Therefore, with respect to the extremely fine fiber 6, $0 < Dr < 6$ should be satisfied as described above, and the above-described problems arise if the Dr exceeds 6.

According to experimental examples, the optical fiber which falls within the aforementioned range of the set value, exhibited desired results of moldability, transmission characteristic, temperature characteristic, presence or absence of the eccentricity. However, the optical fiber which is out of the aforementioned range of the set value, exhibited sole or composite problems of improper moldability, an increase in the transmission loss, improper temperature characteristics, eccentricity.

The optical fiber which falls within the range of the above-described set value has exhibited preferable results in not only the mechanical properties but also the flexibility, and has shows best for all factors particularly in case of C = 60 and Dr = 3.5.

Subsequently, the case that filler is mixed in the reinforced coated layer 5 will be described.

In case of molding the reinforced coated layer 5, if an improper external appearance such as a scratch or burr occurs on the surface of the layer 5, ultrafine particles, generally called "a filler" are mixed in the coated layer 5.

In case of the conventional example, an inorganic filler such as calcium carbonate, or short glass fiber is mixed in the reinforced coated layer for the purpose of improving only the improper external appearance, but the transmission characteristic decreases in the high temperature range at the time of molding the reinforced coated layer (100° to 150° C.).

This is because, since the radial linear expansion coefficient of the reinforced coated layer is $5 \times 10^{-5}$ in the relative relationship between the buffer layer and the reinforced coated layer, while the primary coated layer and the buffer layer (e.g., silicone rubber) is $5 \times 10^{-4}$, the buffer layer exhibited more thermal expansion in the high temperature range, and yet when the side pressure due to the expansion of this case is applied to the optical fiber, the filler in the reinforced coated layer permits it to be irregular, with the result that the optical fiber causes a microbend due to irregular side pressure, thereby increasing the transmission loss.

Since the coated optical fiber of the present invention has the resin layer 4 interposed between the buffer layer 3 and the reinforced resin layer 5 as described above, a problem produced by the filler is said not to arise, but this problem should be obviated.

The problem caused by the filler can be eliminated by suitably setting the diameter of the particles of the filler.

More preferable result can be obtained by adequately setting the quantity of the filler to the heat-curable resin 7.

The filler of this case includes inorganic ultrafine particles and/or thermoplastic ultrafine particles.

When the filler is inorganic ultrafine particles, this is formed of one or more of calcium carbonate, talc, hydrated alumina, clay and zeolite.

This inorganic ultrafine particles have 30 $\mu$m or less of maximum particle diameter and 3.0 $\mu$m or less of mean particle diameter, and the content ratio of the inorganic ultrafine particles is set to 25% or less by weight to the heat-curable resin 7.

In this case, when the 30 $\mu$m or less of the maximum particle diameter of the inorganic ultrafine particles was satisfied, the transmission characteristic and the moldability are simultaneously improved. In a concrete example, the result of "good" can be obtained when the maximum particle diameter is 25 $\mu$m and the mean particle diameter is 3.0 $\mu$m, the result of "excellent" can be obtained when the maximum particle diameter is 10 $\mu$m and the mean particle diameter is 1.0 $\mu$m, and further the result of the "best" can be obtained when the mean particle diameter is 7.0 m$\mu$m.

On the other hand, when the filler is formed of thermoplastic ultrafine particles, it is made of one or more of polystyrene, polystyrene chloride, ABS resin and cellulose plastic, the particle diameter is 5 to 50 $\mu$m, and the softening temperature is 120° C. or less.

The content ratio of the thermoplastic ultrafine particles in the reinforced coated layer 5 is preferably 25% or less by weight to the heat-curable resin 7.

When the thermoplastic ultrafine particles are mixed as a filler within the reinforced coated layer 5, the apparent viscosity of the heat-curable resin 7 increases through the softened ultrafine particles at the time of molding the reinforced coated layer 5, and an external appearance problem of the reinforced coated layer 5 such as a scratch or a burr due to the mold does not, accordingly, occur on the surface of the coated layer 5 and yet since the ultrafine particles are plasticized, irregular side pressure which causes a microbend at the time of molding at a high temperature does not arise, and the coated layer 5 can be molded while suppressing the light transmission loss of the optical fiber 1.

More concretely, when the thermoplastic ultrafine particles in the reinforced coated layer 5 are formed of polystyrene having 30 $\mu$m of mean particle diameter in the above-described coated optical fiber and are mixed by 10% by weight to form the reinforced coated layer 5, almost no improper external appearance is exhibited on the surface of the layer 2, and an increase in the light transmission loss remains within 0 to 0.5 dB/km.

The temperature of the drawing die used at the molding time was 160° to 195° C., and the plasticizing temperature of the thermoplastic ultrafine particles was 106° C.

In the aforementioned $C=(B/A+B)\times 100$, when the filler is thermoplastic ultrafine particles, the particles is contained in A, and the filler is formed of the inorganic ultrafine particles, this is contained in B.

As other technical matters, it is preferable that the optical fiber with buffer layer, i.e., the optical fiber strands may have 0.01 to 0.10% of tensile distortion.

The reason is that, since the feature resides in the fact that the optical fiber strands have tensile distortion in the reinforced coated layer, a compression distortion causing the microbent hardly arises, and even if the reinforced coated layer is not accordingly contracted due to the variations in the external force and the temperature, an increase in the transmission loss of the optical fiber does not almost occur, and the reliability in the management of the product can be enhanced.

An example of fabricating a coated optical fiber relating to the present invention will now be described with reference to FIGS. 4 and 5.

Figure 4:
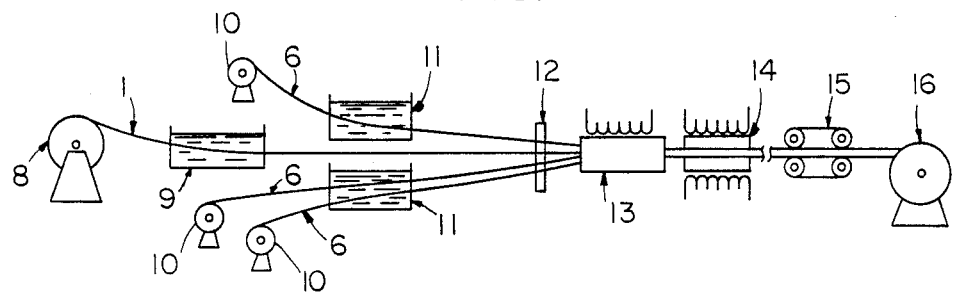
FIGS. 4 and 5 are explanatory views schematically showing a method of fabricating the coated optical fiber.

In FIG. 4, an optical fiber 1 with buffer layer 3 is supplied from a supplying machine 8, passed through an impregnation tank 9, liquid resin to form the resin layer 4 is uniformly adhered on the outer periphery of the buffer layer 3 in the tank 9, while reinforced fiber materials 6, 6, 6, . . . of roving state are supplied from other supplying machines 10, 10, 10, . . . to pass them through impregnation tanks 11, 11, 11, . . . , and the materials 6, 6, 6, . . . are impregnated with liquid-state heat-curable resin 7 in the respective tanks 11, 11, 11, . . .

Subsequently, predetermined resin is adhered and impregnated on the optical fiber 1 and the respective reinforced fiber materials 6, 6, 6, . . . , which are, in turn, passed through a comber board 12, which joins them. Then, the materials 6, 6, 6, . . . are passed through a drawing mold 13 having a heating furnace and a curing furnace 14 to form a predetermined resin layer 4 and a reinforced coated layer 5. In this manner, the layers 4, 5 thus manufactured are drawn by a drawing machine 15, and then wound by a winding machine 16.

Figure 5:
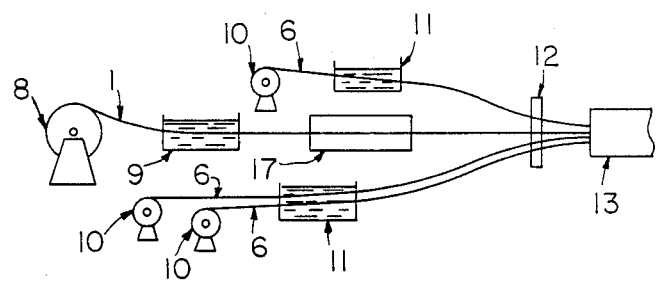

An example of production in FIG. 5 is substantially similar to that in FIG. 4, in case of FIG. 5, it is different from that in FIG. 4 at the point that, after liquid resin for the resin layer 4 is adhered to the outer periphery of the buffer layer 3, the optical fiber with the liquid-state resin is passed through a curing furnace 17 to obtain the shape retaining effect of the resin.

In addition, the resin layer 4 is formed on the outer periphery of the optical fiber 1 in another step, and may be applied to coating means in FIG. 4.

In this case, the tank 9 described in FIG. 4 may be omitted.

In the embodiments shown in FIGS. 4 and 5, a preliminary heating furnace, not show, may be disposed between the impregnation tank 11 and the comber board 12, and the resin formed on the surface of the reinforced fiber material 6 may be cured preliminarily.

In this case, the period of heating to cure the resin in the drawing mold 13 may be shortened, thereby increasing the drawing and molding velocity.

When the filler is mixed in the reinforced coated layer 5, it is stirred to mix predetermined ultrafine particles in the respective tanks 11, 11, 11, ...

When the resin layer 4 has an adhesiveness to the reinforced coated layer 5, the resin layer 4 is thermally expanded in the furnace 14, and the layers 4 and 5 are oppositely bonded in this state.

After the reinforced resin layer 5 is cured, the respective layers become cooled state and contracted, but in this case the bonding state between the resin layer 4 and the coated layer 5 is maintained as it is, while the buffer layer 3 and the resin layer 4 are isolated from one another due to the difference of the thermal expansion coefficient therebetween.

In the foregoing description, the term "outer diameter" means "diameter".

INDUSTRIAL APPLICABILITY

Since the coated optical fiber of the present invention has high transmission characteristics, it is mainly used for a communication, and since the optical fiber has particularly excellent mechanical properties and temperature characteristic, it is adapted for the optical fiber core wire for an underground buried communication cable, aerial inner optical cable, power and photo composite cable.

We claim:

1. A coated optical fiber free of longitudinal cracks comprising:
   (a) a core and a clad (1) around said core;
   (b) a primary coated layer (2) and a silicon resin buffer layer (3) around the outer periphery of the optical fiber (1);
   (c) a curable resin layer (4) around the outer periphery of the buffer layer (3);
   (d) a reinforced thermosetting resin coated (5) around the outer periphery of the resin layer, said reinforced layer (5) including therein a multiplicity of elongated thin reinforcing fiber material (6) therein, said fiber material being selected from the group consisting of glass fiber, carbon fiber, aramide fiber, silica fiber, quartz fiber, and mixtures thereof, and, wherein the core has an outer diameter of between about 50 um to about 125 um, the reinforced resin layer has an outer diameter of between about 950 um to about 1 mm, and the buffer layer has a thickness of about 200 um or less with a Young's modulus of 30 kg/mm$^2$.

* * * * *